United States Patent
Boothby et al.

(10) Patent No.: US 12,555,022 B2
(45) Date of Patent: Feb. 17, 2026

(54) SYSTEMS AND METHODS FOR EMBEDDING GRAPHS USING SYSTOLIC ALGORITHMS

(71) Applicant: D-WAVE SYSTEMS INC., Burnaby (CA)

(72) Inventors: Kelly T.R. Boothby, Vancouver (CA); Peter D. Spear, Burnaby (CA); Mani Ranjbar, Port Coquitlam (CA)

(73) Assignee: D-WAVE SYSTEMS INC., Burnaby (CA)

( * ) Notice: Subject to any disclaimer, the term of this patent is extended or adjusted under 35 U.S.C. 154(b) by 478 days.

(21) Appl. No.: 17/832,327

(22) Filed: Jun. 3, 2022

(65) Prior Publication Data

US 2022/0391744 A1    Dec. 8, 2022

Related U.S. Application Data

(60) Provisional application No. 63/208,122, filed on Jun. 8, 2021.

(51) Int. Cl.
*G06N 10/80* (2022.01)
*G06N 10/60* (2022.01)

(52) U.S. Cl.
CPC ............. *G06N 10/80* (2022.01); *G06N 10/60* (2022.01)

(58) Field of Classification Search
CPC .................. G06N 10/80; G06N 10/60
(Continued)

(56) References Cited

U.S. PATENT DOCUMENTS

| 5,113,352 A | 5/1992 | Finnerty |
| 6,838,694 B2 | 1/2005 | Esteve et al. |

(Continued)

FOREIGN PATENT DOCUMENTS

| JP | 2010233066 A | 10/2010 |
| WO | 2006066415 A1 | 6/2006 |

(Continued)

OTHER PUBLICATIONS

Boothby et al, "Fast Clique Minor Generation in Chimera Qubit Connectivity Graphs", arXiv:1507.04774v1, 2015.

(Continued)

*Primary Examiner* — Suchin Parihar
(74) *Attorney, Agent, or Firm* — Cozen O'Connor (57) ABSTRACT

An accelerated version of a node-weighted path distance algorithm is implemented on a microprocessor coupled to a digital processor. The algorithm calculates an embedding of a source graph into a target graph (e.g., hardware graph of a quantum processor). The digital processor causes the microprocessor to send seeds to logic blocks with a corresponding node in the target graph contained in a working embedding of a node, compute a minimum distance to neighboring logic blocks from each seeded logic block, set the distance to neighboring logic blocks as the minimum distance plus the weight of the seeded logic block, increment the accumulator value by the weight of the seeded logic block, increment the accumulator value by the distance, determine the minimum distance logic block by computing the minimum accumulated value, compute distances to the minimum distance logic block; and read distances from all logic blocks into local memory.

18 Claims, 6 Drawing Sheets

(58) Field of Classification Search
USPC .......................................................... 716/100
See application file for complete search history.

(56) References Cited

U.S. PATENT DOCUMENTS

| | | | |
|---|---|---|---|
| 6,988,058 | B1 | 1/2006 | Sherwin et al. |
| 7,135,701 | B2 | 11/2006 | Amin et al. |
| 7,418,283 | B2 | 8/2008 | Amin |
| 7,533,068 | B2 | 5/2009 | Maassen et al. |
| 7,788,192 | B2 | 8/2010 | Amin |
| 7,843,209 | B2 | 11/2010 | Berkley |
| 7,870,087 | B2 | 1/2011 | Macready et al. |
| 7,876,248 | B2 | 1/2011 | Berkley et al. |
| 7,877,333 | B2 | 1/2011 | Macready |
| 7,984,012 | B2 | 7/2011 | Coury et al. |
| 8,008,942 | B2 | 8/2011 | Van et al. |
| 8,018,244 | B2 | 9/2011 | Berkley |
| 8,032,474 | B2 | 10/2011 | Macready et al. |
| 8,035,540 | B2 | 10/2011 | Berkley et al. |
| 8,073,808 | B2 | 12/2011 | Rose |
| 8,098,179 | B2 | 1/2012 | Bunyk et al. |
| 8,169,231 | B2 | 5/2012 | Berkley |
| 8,174,305 | B2 | 5/2012 | Harris |
| 8,175,995 | B2 | 5/2012 | Amin |
| 8,190,548 | B2 | 5/2012 | Choi |
| 8,195,596 | B2 | 6/2012 | Rose et al. |
| 8,244,662 | B2 | 8/2012 | Coury et al. |
| 8,421,053 | B2 | 4/2013 | Bunyk et al. |
| 8,700,689 | B2 | 4/2014 | Macready et al. |
| 9,129,224 | B2 | 9/2015 | Lanting et al. |
| 9,170,278 | B2 | 10/2015 | Neufeld |
| 9,178,154 | B2 | 11/2015 | Bunyk |
| 9,183,508 | B2 | 11/2015 | King |
| 9,424,526 | B2 | 8/2016 | Ranjbar |
| 9,501,474 | B2 | 11/2016 | Gopalakrishnan |
| 9,501,747 | B2 | 11/2016 | Roy |
| 9,710,758 | B2 | 7/2017 | Bunyk et al. |
| 9,852,231 | B1* | 12/2017 | Ravi .................... G06F 16/9024 |
| 9,881,256 | B2 | 1/2018 | Hamze et al. |
| 10,002,107 | B2 | 6/2018 | Lanting |
| 10,140,248 | B2* | 11/2018 | Maassen van den Brink ............ G06N 5/01 |
| 10,552,755 | B2 | 2/2020 | Lanting et al. |
| 10,789,540 | B2* | 9/2020 | King ..................... G06N 20/00 |
| 11,023,821 | B2 | 6/2021 | Harris et al. |
| 11,907,828 | B2* | 2/2024 | Purandare ............. G06N 3/105 |
| 2002/0190249 | A1 | 12/2002 | Williams et al. |
| 2003/0055513 | A1 | 3/2003 | Raussendorf et al. |
| 2005/0082519 | A1 | 4/2005 | Amin et al. |
| 2005/0167658 | A1 | 8/2005 | Williams et al. |
| 2005/0250651 | A1 | 11/2005 | Amin et al. |
| 2005/0262179 | A1 | 11/2005 | Tucci |
| 2006/0147154 | A1 | 7/2006 | Thom et al. |
| 2008/0052055 | A1 | 2/2008 | Rose et al. |
| 2008/0086438 | A1 | 4/2008 | Amin et al. |
| 2008/0176750 | A1 | 7/2008 | Rose et al. |
| 2008/0218519 | A1 | 9/2008 | Coury et al. |
| 2008/0238531 | A1 | 10/2008 | Harris |
| 2008/0258753 | A1 | 10/2008 | Harris |
| 2009/0241013 | A1 | 9/2009 | Roetteler |
| 2011/0018612 | A1 | 1/2011 | Harris |
| 2011/0022820 | A1 | 1/2011 | Bunyk et al. |
| 2011/0057169 | A1 | 3/2011 | Harris et al. |
| 2011/0060711 | A1 | 3/2011 | Macready et al. |
| 2011/0231462 | A1 | 9/2011 | Macready et al. |
| 2011/0238607 | A1* | 9/2011 | Coury .................... G06T 11/206 706/46 |
| 2012/0094838 | A1 | 4/2012 | Bunyk et al. |
| 2013/0005580 | A1 | 1/2013 | Bunyk et al. |
| 2014/0187427 | A1 | 7/2014 | Macready et al. |
| 2014/0250288 | A1 | 9/2014 | Roy |
| 2014/0324933 | A1 | 10/2014 | Macready et al. |
| 2015/0032993 | A1 | 1/2015 | Amin et al. |
| 2017/0300817 | A1* | 10/2017 | King ..................... G06N 20/00 |
| 2018/0246848 | A1 | 8/2018 | Douglass et al. |
| 2018/0276550 | A1* | 9/2018 | Yarkoni ................. G06N 5/046 |
| 2019/0019101 | A1 | 1/2019 | Neven |
| 2019/0244095 | A1* | 8/2019 | Huang ................... G06N 3/105 |
| 2020/0310797 | A1* | 10/2020 | Corbal ................... G06F 9/3005 |
| 2022/0391744 | A1 | 12/2022 | Boothby et al. |
| 2022/0405455 | A1* | 12/2022 | Ghose .................... G06F 18/29 |
| 2023/0221876 | A1* | 7/2023 | Jung ..................... G06F 3/0644 711/112 |

FOREIGN PATENT DOCUMENTS

| | | |
|---|---|---|
| WO | 2009039634 A1 | 4/2009 |
| WO | 2009143166 A2 | 11/2009 |
| WO | 2012064974 A2 | 5/2012 |
| WO | 2013006836 A1 | 1/2013 |
| WO | 2017075246 A1 | 5/2017 |

OTHER PUBLICATIONS

Feynman, "Simulating Physics with Computers," International Journal of Theoretical Physics 21(6/7): 467-488, 1982.

Friedman et al., "Quantum superposition of distinct macroscopic states," Nature 406:43-46, Jul. 6, 2000.

Gaitan, Frank, and Lane Clark. "Graph isomorphism and adiabatic quantum computing." Physical Review A 89.2 (2014): 022342. ( Year: 2014).

Hamze et al., "Systems and Methods for Problem Solving via Solvers Employing Problem Modification," U.S. Appl. No. 62/040,643, filed Aug. 22, 2014, 80 pages.

Harris et al., "Phase transitions in a programmable quantum spin glass simulator", Science, Jul. 13, 2018.

Harris et al., "Experimental Demonstration of a Robust and Scalable Flux Qubit," arXiv:0909.4321v1, Sep. 24, 2009, 20 pages.

Harris et al., "Experimental Investigation of an Eight-Qubit Unit Cell in a Superconducting Optimization Processor," arXiv:1004.1628v2, Jun. 28, 2010, 16 pages.

Heckmann et al., "Optimal Embedding of Complete Binary Trees into Lines and Grids", Lecture Notes in in Computer Science 2269, 1991.

Il'ichev et al., "Continuous Monitoring of Rabi Oscillations in a Josephson Flux Qubit," Physical Review Letters 91(9): 097906-1-097906-4, week ending Aug. 29, 2003.

International Search Report and Written Opinion, mailed Nov. 7, 2014, for corresponding International Application No. PCT/US2014/047874, 13 pages.

International Search Report, mailed Dec. 2, 2016, for PCT/US2016/015100, 3 pages.

King et al., "Systems and Methods for Embedding Problems Into an Analog Processor," U.S. Appl. No. 62/324,206, filed Apr. 18, 2016, 51 pages.

King, "Systems and Devices for Quantum Processor Architectures," U.S. Appl. No. 61/863,360, filed Aug. 7, 2013, 37 pages.

King, Andrew D., and Catherine C. McGeoch. "Algorithm engineering for a quantum annealing platform." arXiv preprint arXiv:1410.2628(2014). (Year: 2014).

Klymko et al., "Adiabatic Quantum Programming: Minor Embedding With Hard Faults", arXiv, Nov. 7, 2012.

Lanting et al., "Systems and Methods for Increasing the Energy Scale of a Quantum Processor," U.S. Appl. No. 61/858,023, filed Jul. 24, 2013, 49 pages.

Lanting et al., "Systems and Methods for Improving the Performance of a Quantum Processor by Shimming to Reduce Intrinsic/Control Errors," U.S. Appl. No. 62/040,890, filed Aug. 22, 2014, 122 pages.

Lanting, "Systems and Methods for Removing Couplings Between Quantum Devices," U.S. Appl. No. 61/951,708, filed Mar. 12, 2014, 38 pages.

Layeb et al., "A New Quantum Evolutionary Local Search Algorithm for MAX 3-SAT Problem", Springer, 2008.

Lechner et al., "A quantum annealing architecture with all-to-all connectivity from local interactions", Science Advances. Oct. 23, 2015. https://advances.sciencemag.org/content/1/9/e1500838.

(56) References Cited

OTHER PUBLICATIONS

Levitov, et al., "Quantum Spin Chains and Majorana States in Arrays of Coupled Qubits," arXiv:cond-mat/0108266v2 [cond-mat. mes-hall]. Aug. 19, 2001, 7 pages.
Lyakhov et al., "Quantum State Transfer in Arrays of Flux Qubits," arXiv:cond-mat/0509478v1 [cond-mat.mes-hall], Sep. 19, 2005, 10 pages.
Makhlin et al., "Quantum-state engineering with Josephson-junction devices," Reviews of Modern Physics 73 (2):357-400, Apr. 2001.
Martinis, "Superconducting phase qubits," Quantum Inf Process 8:81-103, 2009.
Merrill et al, "Scalable GPU Graph Traversal", Nvidia, Feb. 1, 2012.
Mooij et al., "Josephson Persistent-Current Qubit," Science 285:1036-1039, Aug. 13, 1999.
Mutzel, "Optimization in graph drawing", Technische Universitat Wien, 2002.
Nielsen et al., Quantum Computation and Quantum Information, Cambridge University Press, Cambridge, 2000, "7.8 Other implementation schemes," pp. 343-345.
Orlando et al., "Superconducting persistent-current qubit," Physical Review B 60(22):15398-15413, Dec. 1, 1999.
Paauw, F.G., et al., "Tuning the Gap of a Superconducting Flux Qubit," arXiv:0812.1912v1 [cond-mat.supr-con] Dec. 10, 2008, 4 pages.
Pearson, "On lines and planes of closest fit to systems of points in space", Taylor and Francis Online, Jun. 8, 2010.
Perdomo-Ortiz et al., "A Performance Estimator for Quantum Annealers: Gauge Selection and Parameter Setting.," arXiv:1503. 01083v1 [quant-ph], Mar. 3, 2015, 10 pages.
Rocchetto et al., "Stabilizers as a design tool for new forms of the Lechner-Hauke-Zoller annealer", Science Advances, Oct. 21, 2016.
Roy et al., "CRISP: Congestion reduction by iterated spreading during placement", IEEE, Dec. 28, 2009.
Shields et al., "Area efficient layouts of binary trees in grids", ACM Digital Library, 2001.
Shor, "Introduction to Quantum Algorithms," AT&T Labs—Research, arXiv:quant-ph/0005003 v2, pp. 1-17, Jul. 6, 2001.
Tabia, "Quantum Computing with Cluster States," 2011, retrieved from http://www.perimertinstitute.ca/personal/gtabia/notes/clusterStateQC.pdf, 18 pages.
Venturelli et al., "Quantum Optimization of Fully-Connected Spin Glasses", arXiv, Jun. 29, 2014.
Written Opinion, mailed Dec. 2, 2016, for PCT/US2016/015100, 14 pages.
Young et al., "Adiabatic quantum optimization with the wrong Hamiltonian", arXiv, Oct. 2, 2013.
Zagoskin et al., "Superconducting Qubits," La Physique au Canada 63(4):215-227, 2007.
Fruchterman, et al., "Graph Drawing by Force-directed Placement", Software—Practice and Experience, vol. 21(1 1), 1129-1164 (Nov. 1991).
Kamada, et al., "An Algorithm for Drawings General Undirected Graphs", Information Processing Letters 31 (1989)—7-15, North-Holland—Apr. 12, 1989. 9 pages.
Koren, "Drawing Graphs by Eigenvectors: Theory and Practice", Science Direct. Elsevier, Computers and Mathematics with Application 49 (2005) 1867-1888.
Almeida, J. et al., "Probing Quantum Coherence in Qubit Arrays," J. Phys. B: At. Mol. Opt. Phys. vol. 46, 2013, 8 pages.
Amin et al., "Systems and Methods for Achieving Orthogonal Control of Non-Orthogonal Qubit Parameters," U.S. Appl. No. 61/857,601, filed Jul. 23, 2013, 89 pages.
Amin, "Effect of Local Minima on Adiabatic Quantum Optimization," Physical Review Letters 100(130503), 2008, 4 pages.
Bian et al., "Discrete optimization using quantum annealing on sparse Ising models", Frontiers in Physics, Sep. 18, 2014.
Blatter et al., "Design aspects of superconducting-phase quantum bits," Physical Review B 63: 174511-1-174511-9, 2001.

Bocko et al., "Prospects for Quantum Coherent Computation Using Superconducting Electronics," IEEE Transactions on Applied Superconductivity 7(2):3638-3641, Jun. 1997.
Boros et al., "Local search heuristics for Quadratic Unconstrained Binary Optimization (QUBO)", Springer, Feb. 21, 2007.
Bunyk, "D-Wave processor control circuitry", 2009.
Bunyk, "Quantum Processor With Instance Programmable Qubit Connectivity," U.S. Appl. No. 61/983,370, filed Apr. 23, 2014, 53 pages.
Chittineni et al., "Optimal Parameter Selection for Unsupervised Neural Network Using Genetic Algorithm," International Journal of Computer Science, Engineering and Applications (IJCSEA) 3(5):13-27, 2013.
Choi, "Minor-embedding in adiabatic quantum computation: II. Minor-universal graph design", Springer, Oct. 13, 2010.
Choi, Vicky. "Minor-embedding in adiabatic quantum computation: I. The parameter setting problem." Quantum Information Processing 7.5 (2008): 193-209. (Year: 2008).
Clarke et al., "Superconducting quantum bits," Nature 453:1031-1042, Jun. 19, 2008.
Conlon, David "An Extremal Theorem in the Hypercube," The Electronic Journal of Combinations 17:1 (2010), 6 pages.
Devoret et al., "Superconducting Circuits for Quantum Information: An Outlook," Science 339:1169-1174, Mar. 8, 2013.
Devoret et al., "Superconducting Qubits: A Short Review," arXiv:cond-mat/0411174v1, Nov. 7, 2004, 41 pages.
Douglass et al., "Systems, Devices, Articles, and Methods for Quantum Processor Architecture," U.S. Appl. No. 62/114,406, filed Feb. 10, 2015, 105 pages.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Harris et al., "A Compound Josephson Junction Coupler for Flux Qubits With Minimal Crosstalk," arXiv:0904.3784v1 [cond-mat. supr-con], Apr. 24, 2009, 4 pages.
Non Final Office Action for U.S. Appl. No. 17/234,469, mailed May 1, 2023, 19 pages.
Non-Final Office Action Issued in U.S. Appl. No. 16/988,232, mailed Jun. 14, 2023, 29 pages.
Trummer, Immanuel, and Christoph Koch, "Multiple query optimization on there D-Wave 2X adiabatic quantum computer." arXiv preprint arXiv:1510.06437 (2015). (Year:2015) 12 pages.
Byrka, "An Improved LP-based Approximation for Steiner Tree", 2010.
Cai, et al. A practical heuristic for finding graph minors, arXiv:1406. 2741v1, [qauant-ph] Jun. 10, 2014.
DeVos, et al., "The structure of graphs with no K3,3 immersion" arXiv:1810.12873v2 [math.CO] Nov. 2, 2018.
DeVos, et al., "The structure of graphs with no W4 immersion", arXiv: 1810.12863v1 [math.CO] Oct. 30, 2018.
Gaitan et al., "Graph isomorphism and adiabatic quantum computing," arXiv:1304.5773v2, Feb. 12, 2014, 22 pages.
Ilichev, et al., "Continuous Monitoring of Rabi Oscillations in a Josephson Flux Qubit", Physical Review Letters 91(9): 097906-1-097906-4, week ending Aug. 19, 2003.
Lee et al., "Multi-way spectral partitioning and higher-order Cheeger inequalities", arXiv:1111.1055v6 [math. MG] Nov. 21, 2014.
McCreesh, et al., "The Glasgow Subgraph Solver: Using Constraint Programming to Tackle Hard Subgraph Isomorphism Problem Variants", 2020.
McKay, "Practical graph isomorphism, II", arXiv:1301.1493v1 [cs.DM] Jan. 8, 2013.
Ng, et al., "On Spectral Clustering Analysis and an algorithm", 2002.
Shi, et al., "Normalized Cuts and Image Segmentation", IEEE Transactions on Pattern Analysis and Machine Intelligence, vol. 22, No. 8, Aug. 2000.
Zagoskin—Superconducting Qubits, La Physique au Canada 63(4):215-227, 2007.
Wang, et al., "Gunrock: GPU Graph Analytics", arXiv:1701. 01170v1 [cs.DC], Jan. 4, 2017.

\* cited by examiner

SYSTEMS AND METHODS FOR EMBEDDING GRAPHS USING SYSTOLIC ALGORITHMS

FIELD

This disclosure generally relates to systems and method for embedding graphs.

BACKGROUND

Mapping Problems to Analog Processors

At least some analog processors (e.g., quantum processors) provide a plurality of analog computation devices (e.g., qubits) which are controllably coupled to each other by couplers. Analog processors may take many forms, such as quantum processors having a number of qubits and associated local bias devices, example embodiments of which are described in, for example, U.S. Pat. Nos. 7,533,068, 8,008, 942, 8,195,596, 8,190,548, and 8,421,053. Such quantum processors may operate, for example, via quantum annealing and/or may operate adiabatically. For the sake of convenience, the following disclosure refers generally to "qubits" and "quantum processors", although those skilled in the art will appreciate that this disclose may be implemented in systems comprising other analog processors.

The types of problems that may be solved by any particular embodiment of a quantum processor, as well as the relative size and complexity of such problems, typically depend on many factors. Two such factors may include the number of qubits in the quantum processor and the connectivity (i.e., the availability of communicative couplings) between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of directly communicably coupling to up to three other qubits without any intervening qubits. In other words, there are direct communicative coupling paths available to three other qubits, although in any particular application all or less than all of those communicative coupling paths may be employed. In a quantum processor employing coupling devices between qubits, this would mean a qubit having a connectivity of three is selectively communicably coupleable to each of three other qubits via a respective one of three coupling devices or couplers. Typically, the number of qubits in a quantum processor limits the size of problems that may be solved and the connectivity between the qubits in a quantum processor limits the complexity of the problems that may be solved.

Many techniques for using adiabatic quantum computation and/or quantum annealing to solve computational problems involve finding ways to directly map a representation of a problem to the quantum processor itself. For example, in some approaches problems are solved by casting the problem in an intermediate formulation (e.g., as an Ising spin glass problem or as a quadratic unconstrained binary optimization ("QUBO") problem) which accommodates the number of qubits and/or connectivity constraints in the particular quantum processor and may be mapped directly to the particular quantum processor being employed. Examples of some direct mapping approaches are discussed in greater detail in, for example, US Patent Publication 2008-0052055 and U.S. Pat. No. 8,073,808.

The approach of re-casting a problem in an intermediate formulation and directly mapping the intermediate formulation to the quantum processor can be impractical for some types of problems. For example, a quantum processor with pair-wise interactions between qubits may be well-suited to solving quadratic problems (e.g., QUBO problems), but if the quantum processor lacks higher-order (i.e., more than pairwise) interactions between qubits, then casting a generic computational problem as a QUBO problem may require casting the generic computational problem in a form having only pair-wise interactions between qubits. Higher-order interactions in the original problem may need to be broken down into pair-wise terms in order to be re-cast in QUBO form, which may require significant pre-processing. In some cases, the pre-processing required to re-cast a generic problem in QUBO form and directly map the corresponding QUBO problem to a pairwise-connected quantum processor can be of similar computational complexity to the original problem. Furthermore, breaking down higher-order interactions into pair-wise terms can force multiple qubits to be used to represent the same variable, meaning the scope of problems that can be solved by a particular processor may be reduced.

Such "direct mapping" techniques for interacting with quantum processors limit the type, size, and complexity of problems that can be solved. There is a need in the art for techniques of using quantum processors that are less dependent on the architecture (also referred to herein as the topology) of the processors themselves and enable a broader range of problems to be solved.

Hybrid Computing System Comprising a Quantum Processor

A hybrid computing system can include a digital computer communicatively coupled to an analog computer. In some implementations, the analog computer is a quantum computer and the digital computer is a classical computer.

The digital computer can include a digital processor that can be used to perform classical digital processing tasks described in the present systems and methods. The digital computer can include at least one system memory which can be used to store various sets of computer- or processor-readable instructions, application programs and/or data.

The quantum computer can include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

A method for embedding a source graph S into a target graph T is described. The source and target graph each have a respective plurality of nodes and weighted edges. The method is executed by a digital processor communicatively coupled at least one microprocessor. The at least one microprocessor has one logic block per each node of the target graph. The logic blocks are communicatively coupled according to the edges of the target graph. The method comprises, for each neighbor v of a node u of the source graph S, wherein v is mapped to the target graph T via a working embedding E(v) that is non-empty: causing the microprocessor to send seeds to logic blocks with a corresponding node in the target graph contained in E(v); causing the microprocessor to compute a respective minimum distance N to neighboring logic blocks from each seeded logic block; causing the microprocessor to set, for each seeded logic block, a respective distance D to neighboring logic blocks as the respective minimum distance N plus a respective weight of the seeded logic block; causing the microprocessor to increment, for each seeded logic block, a respective accumulator value by a respective weight of the seeded logic block; causing the microprocessor to increment, for each seeded logic block, the respective accumulator value by the respective distance D; causing the microprocessor to determine a minimum distance logic block by computing a minimum accumulated value A' over the respective accumulator values of the seeded logic blocks; causing the microprocessor to compute distances $D_{min}$, for each logic block, to the minimum distance logic block; and causing the microprocessor to read distances $D_{min}$ from all logic blocks into local memory.

The method may further comprise causing the microprocessor to perform at least one of: sending edge weights to the logic blocks, sending edge masks to the logic blocks, and sending tie-break values to the logic blocks, before causing the microprocessor to send seeds to logic blocks. The method may further comprise causing the microprocessor to set the respective accumulator value to zero for all logic blocks, after causing the microprocessor to perform at least one of: sending edge weights to the logic blocks, sending edge masks to the logic blocks, and sending tie-break values to the logic blocks. The microprocessor may compute distances $D_{min}$ by computing a respective minimum distance N to the minimum distance logic block from each logic block and setting, for each logic block, a respective distance $D_{min}$ to the minimum distance logic block as the respective minimum distance N plus a respective weight of the logic block. The at least one microprocessor may be a field-programmable gate arrays (FPGA) or an application-specific integrated circuit (ASIC). The target graph may be the hardware graph of a quantum processor and the neighboring logic blocks are communicatively coupled according to the edges of the hardware graph of the quantum processor. The method may further comprise the digital processor using distances $D_{min}$ to determine an embedding of the source graph to the hardware graph of the quantum processor; and programming the quantum processor to embed the source graph into the hardware graph. The microprocessor may use unique tie-break values of each seeded logic block to determine a minimum distance logic block, should more than one logic block have minimum accumulated value A'. The microprocessor may for each seeded logic block: broadcast a $i^{th}$ most significant bit of the distance D to a first neighbor, wherein i is the most significant bit of D; determine whether all bits of D have been broadcasted; in response to determining that all bits of D have been broadcasted, until all bits of D have been broadcasted, store the $i^{th}$ most significant bit of the distance D in an array Z; compute the minimum entry of Z; set a value of the minimum distance N to twice the value of the minimum distance N plus the minimum entry of Z; and broadcast a $(i+1)^{th}$ most significant bit of the distance D to the first neighbor.

A hybrid computing system for embedding a source graph S into a target graph T is described. The source and target graph each have a respective plurality of nodes and weighted edges. The hybrid computing system comprises at least one digital processor, communicatively coupled at least one microprocessor. The at least one microprocessor has one logic block per each node of the target graph and logic blocks are communicatively coupled according to the edges of the target graph. The digital processor is operable to, for each neighbor v of a node u of the source graph S, wherein v is mapped to the target graph T via a working embedding E(v) that is non-empty: cause the microprocessor to send seeds to logic blocks with a corresponding node in the target graph contained in E(v); cause the microprocessor to compute a respective minimum distance N to neighboring logic blocks from each seeded logic block; cause the microprocessor to set, for each seeded logic block, a respective distance D to neighboring logic blocks as the respective minimum distance N plus a respective weight of the seeded logic block; cause the microprocessor to increment, for each seeded logic block, a respective accumulator value by a respective weight of the seeded logic block; cause the microprocessor to increment, for each seeded logic block, the respective accumulator value by the respective distance D; cause the microprocessor to determine a minimum distance logic block by computing a minimum accumulated value A' over the respective accumulator values of the seeded logic blocks; cause the microprocessor to compute distance $D_{min}$, for each logic block, to the minimum distance logic block; and causing the microprocessor to read distances $D_{min}$ from all logic blocks into local memory. The at least one digital processor may be communicatively coupled to a quantum processor, the quantum processor having a plurality of qubits communicatively coupled according to a hardware graph, wherein the target graph T corresponds to the hardware graph. Neighboring logic blocks may be communicatively coupled according to the edges of the hardware graph of the quantum processor. The at least one digital processor may be further operable to: use distances $D_{min}$ to determine an embedding of the source graph to the hardware graph; and program the quantum processor to embed the source graph into the hardware graph. The at least one microprocessor is selected from a group consisting of: a programmable gate arrays (FPGA), and an application-specific integrated circuit (ASIC). The digital processor may be further operable to cause the microprocessor to perform at least one of: sending edge weights to the logic blocks, sending edge masks to the logic blocks, and sending tie-break values to the logic blocks, before causing the microprocessor to send seeds to logic blocks. The digital processor may be further operable to cause the microprocessor to set the respective accumulator value to zero for all logic blocks, after causing the microprocessor to perform at least one of: sending edge weights to the logic blocks, sending edge masks to the logic blocks, and sending tie-break values to the logic blocks. The at least one digital processor may be operable to cause the microprocessor to compute a respective minimum distance N to the minimum distance logic block from each logic block, and cause the microprocessor to set, for each logic block, a respective distance $D_{min}$ to the minimum distance logic block as the respective minimum distance N plus a respective weight of the seeded logic block. The digital processor may be operable to cause the microprocessor to use unique tie-break values of each seeded logic block to determine a minimum distance logic block, should more than one logic block have minimum accumulated value A'. The digital processor may be operable to, for each seeded logic block: broadcast a $i^{th}$ most significant bit of the distance D to a first neighbor, wherein i is the most significant bit of D; determine whether all bits of D have been broadcasted; in response to determining that all bits of D have been broadcasted, until all bits of D have been broadcasted, store the $i^{th}$ most significant bit of the distance D in an array Z; compute the minimum entry of Z; set a value of the minimum distance N to twice the value of the minimum distance N plus the minimum entry of Z; and broadcast an $(i+1)^{th}$ most significant bit of the distance D to the first neighbor

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
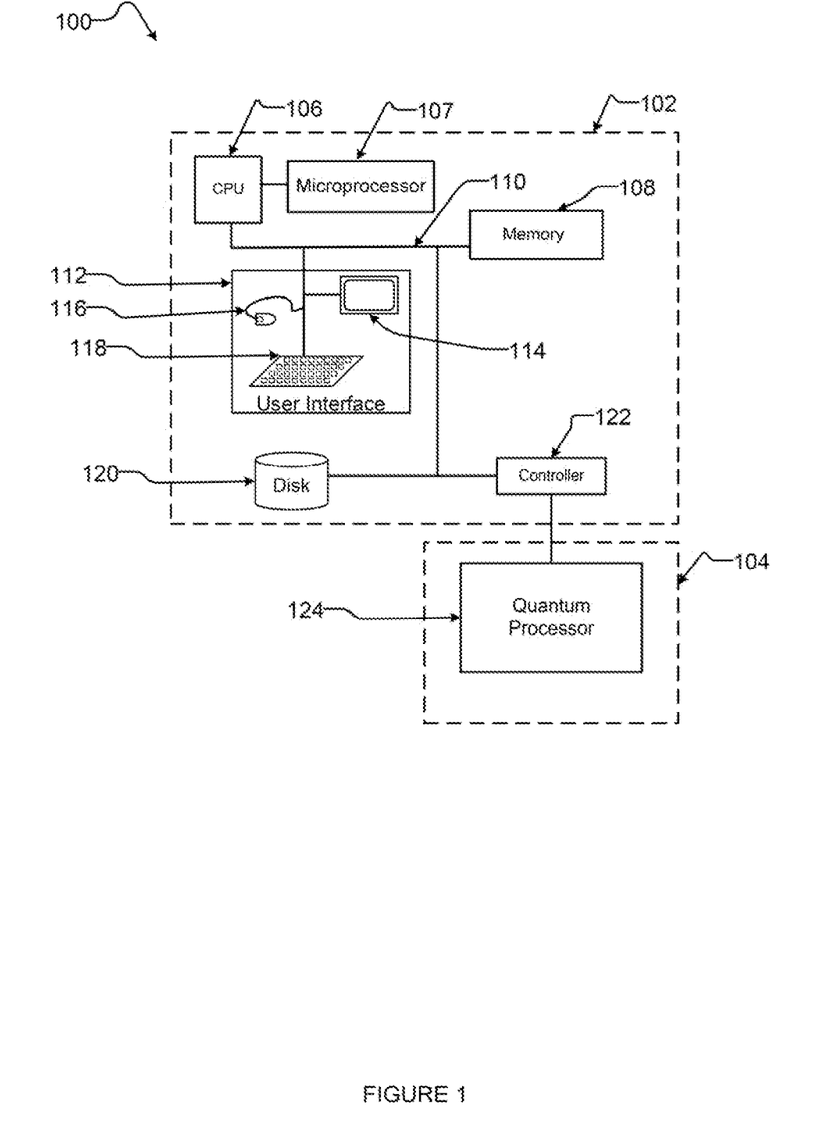
FIG. 1 is a schematic diagram of an example hybrid computing system comprising a digital processor and a quantum processor.

FIG. 1 illustrates a hybrid computing system 100 including a classical computer 102 coupled to a quantum computer 104. The example classical computer 102 includes a digital processor (CPU) 106 that may be used to perform classical digital processing tasks, and hence is denominated herein and in the claims as a classical processor.

Classical computer 102 may include at least one digital processor (such as central processor unit 106 with one or more cores), at least one system memory 108, and at least one system bus 110 that couples various system components, including system memory 108 to central processor unit 106. The digital processor may be any logic processing unit, such as one or more central processing units ("CPUs"), graphics processing units ("GPUs"). Central processor unit 106 may be communicatively coupled to one or more microprocessor 107. Microprocessor 107 may be one or more digital signal processors ("DSPs"), application-specific integrated circuits ("ASICs"), programmable gate arrays ("FPGAs"), programmable logic controllers (PLCs), etc.

Classical computer 102 may include a user input/output subsystem 112. In some implementations, the user input/output subsystem includes one or more user input/output components such as a display 114, mouse 116, and/or keyboard 118.

System bus 110 can employ any known bus structures or architectures, including a memory bus with a memory controller, a peripheral bus, and a local bus. System memory 108 may include non-volatile memory, such as read-only memory ("ROM"), static random-access memory ("SRAM"), Flash NANO; and volatile memory such as random access memory ("RAM") (not shown).

Classical computer 102 may also include other non-transitory computer or processor-readable storage media or non-volatile memory 120. Non-volatile memory 120 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 120 may communicate with the digital processor via system bus 110 and may include appropriate interfaces or controllers 122 coupled to system bus 110. Non-volatile memory 120 may serve as long-term storage for processor- or computer-readable instructions, data structures, or other data (sometimes called program modules) for classical computer 102.

Although classical computer 102 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory, or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the classical computer 102 and quantum computer 104. For example, the system memory 108 may store processor- or computer-readable instructions, data structures, or other data which, when executed by a processor or computer causes the processor(s) or computer(s) to execute one, more or all of the acts of methods 400 (FIG. 4), 500 (FIG. 5) and 600 (FIG. 6).

In some implementations system memory 108 may store processor- or computer-readable calculation instructions to perform pre-processing, co-processing, and post-processing to quantum computer 104. System memory 108 may store at set of quantum computer interface instructions to interact with quantum computer 104.

Quantum computer 104 may include one or more quantum processors such as quantum processor 124. Quantum computer 104 can be provided in an isolated environment, for example, in an isolated environment that shields the internal elements of the quantum computer from heat, magnetic field, and other external noise (not shown). Quantum processor 124 include programmable elements such as qubits, couplers and other devices. In accordance with the present disclosure, a quantum processor, such as quantum processor 124, may be designed to perform quantum annealing and/or adiabatic quantum computation. Example of quantum processor are described in U.S. Pat. No. 7,533,068.

A quantum processor may comprise a topology including a plurality of qubits and coupling devices providing controllable communicative coupling between qubits (e.g., between respective pairs of qubits). The number of qubits and the connectivity (i.e., the number of available couplings each qubit has to other qubits) in a quantum processor's topology are typically fixed, thereby limiting the scope of problems which may be solved by the processor. As a result, there is a need for techniques that facilitate solving problems of different structures via a quantum processor and/or a hybrid computing system comprising a quantum processor. For example, solving a problem that has more variables than the fixed number of qubits in the quantum processor may entail using the problem decomposition techniques described in U.S. Pat. Nos. 7,870,087 and 8,032,474.

In at least some quantum processor topologies, the available connectivity may not provide couplings between all qubits representing variables and, accordingly, some problem formulations may include variable couplings that are not available in the quantum processor topology. The present systems and methods provide techniques for reformulating at least some problems to be solved via less-than-fully-connected quantum processor.

Throughout this specification, the term hardware graph and specific topology are generally used to refer to the specific fixed architecture or topology of a quantum processor (i.e., the fixed number of qubits and connectivity between qubits in the quantum processor topology). A topology may be represented in a graph where a fixed number of qubits corresponds to or is represented by the nodes of the graph and the fixed connectivity corresponds to or is represented by the edges between the nodes. Examples of quantum processor topologies are described in greater detail in International Patent Application WO2006066415, U.S. Pat. Nos. 9,170,278, 9,178,154 and International Patent Application WO2017214331A1.

A problem to be solved via a quantum computer can have one or more decision variables and one or more constraints that apply to the decision variables. The problem may be formulated in terms of a problem graph to be represented in the hardware graph of a quantum processor, where each decision variable is represented by a node or vertex in the problem graph and each constraint is represented by an edge between nodes or vertices. Throughout this specification and the appended claims the term 'embedding' refers to finding a representation of the problem graph in the hardware graph, the term 'embedded problem' refers to a representation of the problem graph in the hardware graph, and the term 'mapping of the problem graph to the hardware graph' refers to a transformation that assigns a specific node of the problem graph to one or more qubits in the hardware graph.

A person skilled in the art will recognize that the terms 'node' and 'vertex' can be used interchangeably in a graph. Therefore, for the purpose of this specification and the appended claims, the term 'node' can be substituted for 'vertex' and 'vertex' can be substituted for 'node'.

When solving a problem, represented by a problem graph, with an analog computer, the limitations of the hardware graph (e.g., limited connectivity) may necessitate that embedding techniques be employed to map the problem graph to the hardware graph of the analog computer. When embedding problem graphs to hardware graphs, a lack of connectivity in the hardware graph may present a challenge in directly mapping each decision variable to a qubit and each constraint to a coupler between qubits. Generally, an embedding contains one or more set of connected qubits in the hardware graph that forms connected subgraphs of the hardware graph. Each set of such qubits is called a chain. As used herein, the term "chain" refers to connected subgraphs with any (connected) topology of qubits and couplers, and not to any particular subgraph topology. For example, a fully-connected subgraph with n qubits may be referred to as a chain for any integer n. Examples of embedding techniques are described in U.S. Pat. Nos. 7,984,012, 8,244,662, 9,501,474, 10,755,190 and https://arxiv.org/abs/1406.2741.

Heuristic tools have been developed for minor embedding, e.g., given a minor and target graph, a heuristic tool tries to find a mapping that embeds the minor into the target graph. Techniques for finding graph minor embeddings can be used to find minors in arbitrary graphs for a variety of applications. However, due to the constraints of fixed hardware graph architectures in quantum processors, there is a need for techniques for embedding Ising problems onto quantum processors, (e.g., quantum annealers).

An implementation of the algorithm described in https://arxiv.org/abs/1406.2741, here referred to as 'minorminer', uses a form of Dijkstra's algorithm (https://en.wikipedia.org/wiki/Dijkstra%27s_algorithm) in the tearup-and-replace operation. The algorithm embeds a source graph S, which can, for example, represent the graph of a problem to be solved, into a target graph T, which can, for example, represent a hardware graph of an analog processor, as a graph minor. During the execution of the algorithm, a working embedding E maps nodes in the source graph S to connected set of nodes of the target graph T. A set of connected nodes is referred throughout this specification and the appended claims as a chain. In some instances, the target graph T may be a subgraph of a graph T'. In some implementations, T' may represent the hardware graph of a quantum processor with all devices (e.g., qubit and couplers) available and calibrated. Graph T may have fewer qubits or couplers than T'.

The minorminer algorithm may be summarized by the following steps:

1) If the working embedding E contains a chain for u, where u is a node in S, the source graph, remove the chain.
2) Optionally, remove unused portions of chains E[v] for neighbors v of u. In this context, the "unused portion" is a collection of nodes which can be removed from E[u] without disconnecting it into multiple components, and without disconnecting it from neighbors of v, other than u.
3) For each neighbor v of u with E[v] nonempty, and for each node q of T, compute the minimum node-weighted distance from q to a nearest node in E[v].
4) For each node q of T, compute the sum of distances computed in (3).
5) Select a node q of T which minimizes the sum of distances computed in (4). If more than one node minimizes the sum of distances, select one at random.
6) For each neighbor v of u with E[v] nonempty, compute a shortest path from q to a nearest node in E[v].
7) Update E[u] to be the union of paths computed in (6).

A parallelized variant of an embedding heuristic may execute multiple copies of Dijkstra's algorithm in parallel, whence the total runtime takes at least as much time as a single full run of Dijkstra's algorithm on the target graph. Therefore, speed may become a bottleneck for larger or complex problems. The systems and methods of the present specification implement a network of finite state machines that can be used to accelerate Dijkstra's algorithm on fixed hardware graphs such hardware graphs of quantum processors. This system may be optimized for implementation in FPGA/ASIC settings.

An accelerated version of a node-weighted path distance algorithm may be implemented as a systolic algorithm suitable for FPGA, ASIC or similar technologies, to replace steps (3) through (6) of the heuristic embedding algorithm described above. Several variations of this algorithm may exist. The steps (1) through (7) above are chosen as representative for their analogy to the systolic algorithm presented below; however, a person skilled in the art may understand that a different number of steps can be chosen to implement the systolic algorithm.

A systolic algorithm has many systolic cells that can operate in parallel, and each of them is to be implemented by a logic block in a microprocessor with a systolic architecture, where the logic block is also called a node module.

Figure 2:
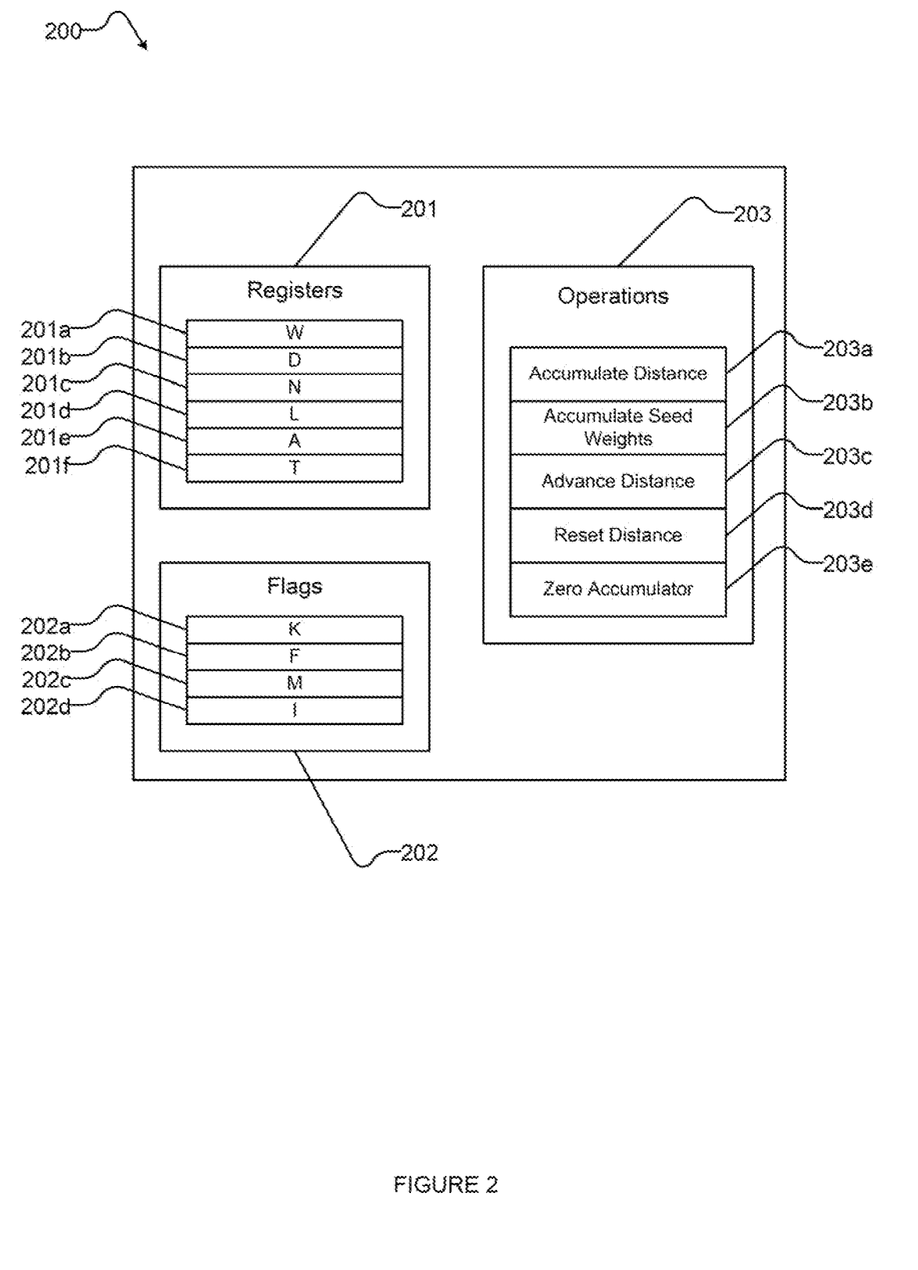
FIG. 2 is a schematic diagram of an example logic block a systolic array according to the present disclosure.

FIG. 2 is a is a schematic diagram of an example logic block 200 a systolic architecture, for example implemented in a microprocessor (e.g., FPGAs or ASICs) such as microprocessor 107 of FIG. 1. Logic block 200 may represent a node in a target graph, for example a device in the architecture of a hardware graph.

Logic block 200 may have local registers 201a through 201e (collectively, 201). In some instances, registers 201 are implemented as unsigned fixed-point integer registers, and in other instances, some or all may be unsigned floating-point number registers. Those skilled in the art will recognize that some of registers 201 (e.g., registers 201a, 201b, 201c, or 201d) may be omitted as physical registers in favor of logical abstractions.

A person skilled in the art may understand that the list of registers 201 given below is provided for example purposes only and in another implementation logic block 200 may have a different number of registers 201.

Logic block 200 may have the following registers:
Register 201a (W) represents the weight of logic block 200.
Register 201b (D) represents the upper bound on the distance to this node the nearest seed of a distance algorithm.
Register 201c (N) represents the minimum distance to neighboring nodes.
Register 201d (L) represents the previous value of N.
Register 201e (A) represents an accumulator.
Register 201f (T) represents a tie-break value.
Registers 201b, 201c and 201d (D, N and L, respectively) have the same bit-length, specified as BIT_LENGTH.

Additionally, logic block 200 may have local flags 202a through 202d (collectively, 202). A person skilled in the art may understand that the list of flags 202 given below is provided for example purposes only and in another implementation logic block 200 may have a different number of flags 202.

Logic block 200 may have the following local flags 202:
Flag 202a (K) is enabled if this node is a seed of the distance computation algorithm (i.e., the systolic algorithm).
Flag 202b (F) is enabled when register 201b (D) is decreased and disabled otherwise.
Flag 202c (M) is an array of flags, one for each neighbor. Each M[i] is enabled when the distance to the corresponding neighbor is equal to N and I[i]=0, and disabled otherwise. There is an extra flag, M[0], corresponding to the local node.
Flag 202d (I) is an array of flags, one for each neighbor. Each I[i] is enabled when the edge between this logic block the corresponding neighbor should be ignored. In one implementation where the target graph represents the hardware graph of a quantum processor, a qubit is disabled by masking off all of its edges, i.e., disabling all IN for that qubit.

Logic block 200 supports several operations or routines 203a through 203e (collectively, 203). Those skilled in the art will understand that operations 203 may be implemented as a higher-level abstraction over micro-operations, and that other operations may be required to support data I/O. Operations 203 may be performed simultaneously on all logic blocks in the systolic array. In some implementations, some operations 203 may be fully or partially serialized, provided all logic blocks finish their work before any logic block begins work on the next operation.

A person skilled in the art may understand that the list of operations 203 given below is provided for example purposes only and in another implementation logic block 200 may have a different number or type of operations 203.

Logic block 200 may support the following operations 203:

Operation 203a: ACCUMULATE_DISTANCE

This operation increments the Accumulator register (register 201e) of logic block 200 to the current value of the Accumulator plus the value of the of register 201b (upper bound on the distance D from the nearest seed). If the incremented value of the Accumulator exceeds a threshold (e.g., the maximum value that can be stored in the register), the register is set to a maximum value (e.g., MAX_DISTANCE).

set A=A+D, if the sum overflows,
set A=MAX_DISTANCE.

Operation 203b: ACCUMULATE_SEED_WEIGHTS

This operation increments the Accumulator register (register 201e) to the current value of the register plus the weight W (register 201a) of logic block 200, if logic block 200 is a seed of the distance computation algorithm (i.e., the local flag K (flag 202a) is enabled).

if K=1, set A=A+W
otherwise, do nothing.

Operation 203c: ADVANCE_DISTANCE

This operation computes the minimum distance from logic block 200 to the neighboring nodes, then returns the value of the minimum distance plus the weight of node 200. If the value of the distance exceeds a threshold (e.g., the maximum value that can be stored in the register), the register D (register 201b) is set to a maximum value (e.g., MAX_DISTANCE).

Note, the ADVANCE_DISTANCE operation has the property that if all logic blocks have local flag F (flag 202b) disabled after one iteration (indicating that the value of the distance register D (register 201b) is not decreasing), then subsequent ADVANCE_DISTANCE operations will not change the F flags.

set L=N;
compute minimum distance N to neighboring nodes x which have I[x]=0;
set M[i]=1 for each neighboring node with distance N;
if N<L, set F=1, otherwise, set F=0;
set D=N+W, if the sum overflows,
set D=MAX_DISTANCE.

Operation 203d: RESET_DISTANCE

This operation reset to zero the value of the distance register D (register 201b) and the minimum distance register L (register 201d), and enables the local flag F (flag 202b, indicating register D has been decreased), assuming logic block 200 is a seed of the distance computation algorithm (i.e., the local flag K (flag 202a) is enabled). Otherwise, both the value of the distance register D and the minimum distance register L are set to a maximum value (e.g., MAX_DISTANCE) and the local flag F is disabled.

if K=1, set D=0, F=1, and N=0;
otherwise, set D=MAX_DISTANCE, F=0, and N=MAX_DISTANCE.

Operation 203e: ZERO_ACCUMULATOR

This operation resets to zero the value of the Accumulator register (register 201e) in logic block 200.

set A=0.

Figure 3:
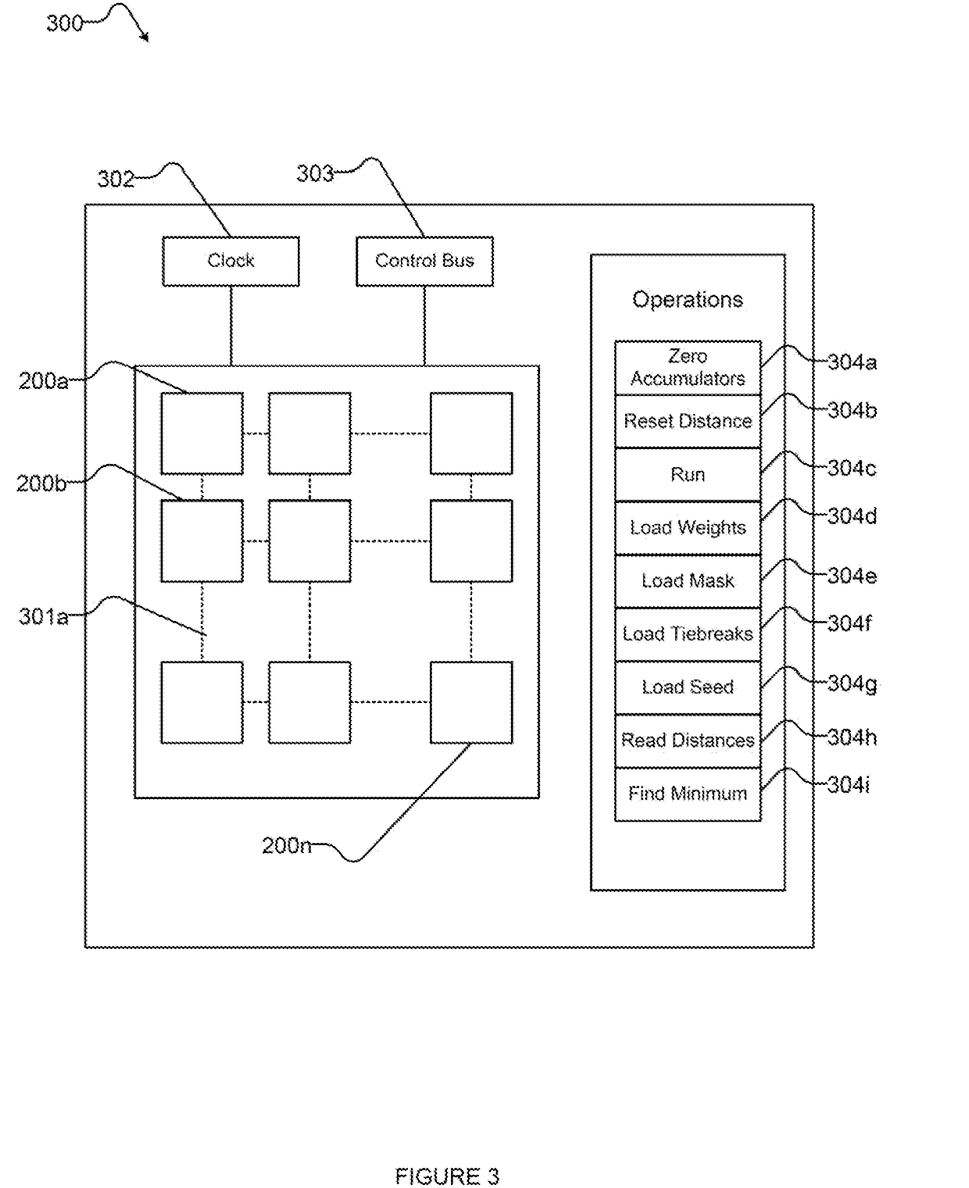
FIG. 3 is a schematic diagram of an example microprocessor comprising logic blocks of FIG. 2, according to the present disclosure.

FIG. 3 is a schematic diagram of an example microprocessor 300 comprising logic blocks 200a through 200n (collectively, 200).

One logic block 200 is created per each node of T' in a systolic architecture of microprocessor 300. T' may represent the hardware graph of a quantum processor with all devices (e.g., qubit and couplers) available and calibrated. In at least one implementation, not all devices may be available and unavailable devices are masked off. Graph T may have fewer qubits or couplers than T'. The systolic architecture (e.g., FPGAs, or ASICs) can be programmed once for T', then quickly reconfigured to support multiple quantum processor with hardware graphs T that are subsets of T'.

The created logic blocks 200 are connected according to the edges of T', via edges 301a through 301m (collectively 301, only one shown in FIG. 3 to reduce visual clutter). In some instances, logic blocks 200 may have additional connections to nearby logic blocks in order to facilitate data input/output (I/O); or the data I/O may be facilitated through a global data bus; or a combination of the two strategies. Additionally, all logic blocks 200 are connected to a single clock source 302 and a global control bus 303 to provide Single Instruction/Multiple Data (SIMD) computation by the systolic array. Each logic block 200 is connected to at most m other logic blocks, where m is the maximum degree of connectivity (MAX_DEGREE) of the graph. Each logic block 200 can receive input signals and produce output signals through channels, and a plurality of logic blocks 200 are connected into a fixed graph which, in some implementations, may represent the hardware graph of a quantum computer.

Further, microprocessor 300 supports a plurality of operations 304a through 304i (collectively, 304). A person skilled in the art may understand that the list of operations given below is provided for example purposes only and in another implementation microprocessor 300 may have a different number or type of operations.

Operation 304a: ZERO_ACCUMULATORS

This operation sends the operation ZERO_ACCUMULATOR (operation 203e of FIG. 2) to all logic blocks 200 over global control bus 303.

Operation 304b: RESET_DISTANCES

This operation sends the RESET_DISTANCE operation (operation 203d of FIG. 2) to all logic blocks 200 over global control bus 303.

Operation 304c: RUN

This operation sends the operation ADVANCE_DISTANCE (operation 203c of FIG. 2) over global control bus 303, until all logic blocks 200 have disabled local flag 202b (F=0). Note, the ADVANCE_DISTANCE operation has the property that if all logic blocks 200 have F=0 after one iteration, then subsequent ADVANCE_DISTANCE operations will not change the F flags, so the RUN operation will not terminate immediately upon this condition being met.

Operation 304d: LOAD_WEIGHTS

This operation retrieves edge weights from local memory or a host system and sends them to logic blocks 200. The weights are then stored in the register 201a (W) of each logic block 200.

Operation 304e: LOAD_MASKS

This operation retrieves edge masks from local memory or a host system and sends them to logic blocks 200. Edge masks are then stored in the flag 202d (flag array I) of each logic block 200. A node, (e.g., a qubit in the case the target graph is the hardware graph of a quantum processor) is disabled by masking off all of its edges.

Operation 304f: LOAD_TIEBREAKS

This operation retrieves tie-break values from local memory or a host system and sends them to logic blocks 200. Tie-break values are unique to their corresponding node and are stored into register 201f (register T).

Operation 304g: LOAD_SEEDS

This operation retrieves seeds from local memory or the host system and sends them to logic blocks 200. For each seed, the corresponding flag 202a (K=1) is enabled.

Operation 304h: READ_DISTANCES

This operation reads distances D from logic blocks 200 into local memory, or to a host system.

Operation 304i: FIND_MINIMUM

This operation computes the minimum accumulated value A' of all logic blocks 200 and enables the respective local flag 202a (e.g., K=1) for each logic block 200 for which the Accumulator register value (stored in respective register 201e) is A=A', and disables the local flag 202a (e.g., K=0) otherwise. The operation computes the minimum tie-break value T' from the tie-break values stored in register 201f of all logic blocks 200 with enabled local flag 202a (K=1), and disables local flag 202a (K=0) for each logic block 200 with T!=T'. This step ensures that there is a unique minimum node with enabled local flag K, provided that the tie-break values are unique.

Figure 4:
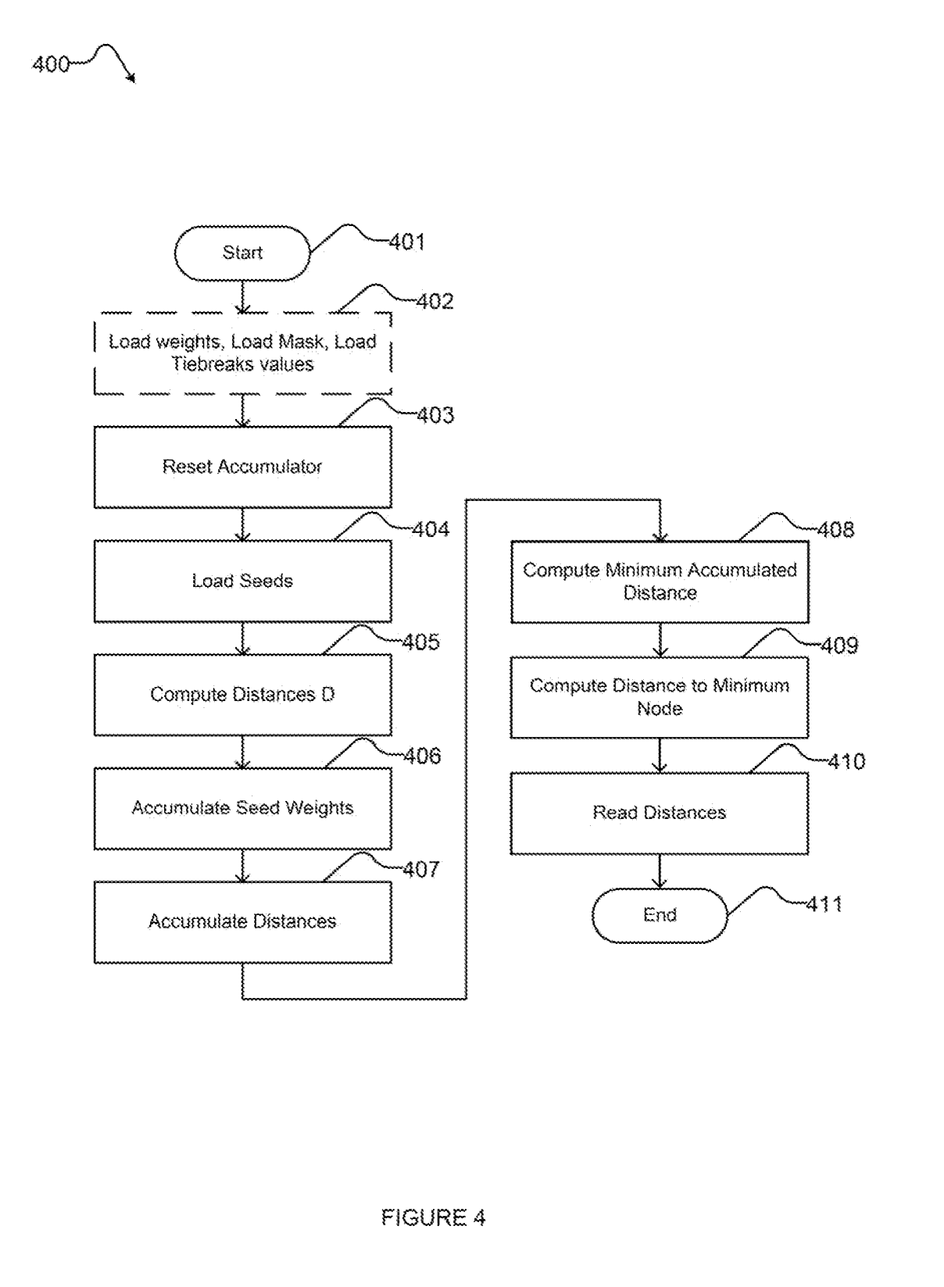
FIG. 4 is a flow chart showing an example method for embedding graphs using a systolic algorithm.

FIG. 4 is a flow chart of an example method 400 for embedding graphs using a systolic algorithm. Method 400 may be implemented by a digital processor in a computing system, for example hybrid computing system 100 of FIG. 1, where the digital processor is communicatively coupled to at least one microprocessor, for example microprocessor 300 of FIG. 3. The microprocessor may have one logic block, for example logic block 200 of FIG. 2, per each node of the target graph and logic blocks may be communicatively coupled according to the edges of the target graph. Method 400 may be optimized for implementation in FPGA or ASIC settings, where logic blocks are connected into a fixed graph (the target graph). In some implementations, the fixed graph may represent the hardware graph of quantum processor 124 of FIG. 1.

Method 400 comprises acts 401 to 411; however, a person skilled in the art will understand that the number of acts is an example, and, in some implementations, certain acts may be omitted, further acts may be added, and/or the order of the acts may be changed. Method 400 will be described with reference to logic blocks 200 and microprocessor 300.

Method 400 starts at 401, for example in response to a call from another routine.

At 402, optionally, the digital processor sends calls to all logic blocks in the microprocessor to initialize parameter values. Parameters initialized at 402 may be, for example, the node weights, the edge masks and tie-break values. Tie-break values are unique to their corresponding node. In one implementation, the digital processor sends calls to run at least one of the operations 304d, 304e, 304f (LOAD_WEIGHTS, LOAD_MASKS, and LOAD_TIEBREAKS, respectively) on all logic blocks. If omitted, stored values from a previous run of method 400 may be used.

At 403, the digital processor sends calls to all logic blocks 200 to reset to the value of accumulator register 201e. In at least one implementation, the digital processor sends calls to all logic blocks 200 to perform operation 304a (ZERO_ACCUMULATORS). For all logic blocks 200 in the microprocessor 300, set A=0.

At 404, for each node neighbor v of node u with the embedding E[v] nonempty, the digital processor sends a call to mark v as seed of the distance computation algorithm. The digital processor uses each chain embedding as a seed of the algorithm. In at least one implementation, the digital processor sends a call to logic blocks 200 to perform operation 304g (LOAD_SEEDS) so that a logic block 200 has enabled respective local flag 202a (e.g., K=1) if and only if the corresponding node is contained in E[v].

At 405, for each neighbor v of u with E[v] nonempty, the digital processor computes the minimum distance from a respective logic block 200 to the neighboring nodes, then returns the value of the distance D as the minimum distance plus the weight of logic block 200. In at least one implementation, the digital processor sends a call to perform operation 304c (operation RUN). Operation 203c (ADVANCE_DISTANCE) is sent over global control bus 303, until all logic blocks for neighbor v of u with E[v] nonempty have disabled local flag 202b (F=0).

At 406, for each neighbor v of u with E[v] nonempty, the digital processor increments register 201e (the Accumulator register) to the current value of the register plus the weight W (stored in register 201a) of logic block 200. In at least one implementation, the digital processor sends a call to perform operation 203b (operation ACCUMULATE_SEED_WEIGHTS).

At 407, for each neighbor v of u with E[v] nonempty, the digital processor increments register 201e (the Accumulator register) of logic block 200 to the current value of the Accumulator plus the distance D, calculated at 405. In at least one implementation, the digital processor sends a call to perform operation 203a (operation ACCUMULATE_DISTANCE).

At 408, the digital processor computes minimum accumulated value of the respective registers 201e (the Accumulator register) of all logic blocks 200 that are seed of the distance computation algorithm. The digital processor uses the unique tie-break value of each node to ensure there is a unique node with minimum value of the Accumulator register. In at least one implementation, the digital processor sends a call to logic blocks 200 to perform operation 304i (operation FIND_MINIMUM).

At 409, the digital processor computes distances to the minimum node found at 408 from all the logic blocks, then returns the value of the distance $D_{min}$ as the minimum distance plus the weight of the logic block. In at least one implementation, the digital processor sends a call to all logic blocks 200 to perform operation 304c (operation RUN). The minimum node found at 408 is unique because of the uniqueness of tie-break values and will have a stored distance value in register 201b D=0. Those skilled in the art will understand that the actual paths may be efficiently computed by the digital processor from this distance computation.

At 410, the digital processor reads distances computed at 409 from logic blocks 200. In at least one implementation, the digital processor sends a call to all logic blocks 200 to perform operation 304h (operation READ_DISTANCES). The digital processor may use method 400 for constructing embeddings for a quantum processor. In at least one implementation, digital processor 106 of FIG. 1 programs quantum processor 124 according to the distances computed at act 409 and read at act 410 of method 400. Programming quantum processor 124 may include determining a strength of qubit and couplers biases and applying the qubit and coupler biases to quantum processor 124.

At 411, method 400 terminates, until it is, for example, invoked again.

In some implementation of the systolic array, where there is a single direct electrical connection in each direction in logic blocks 200, each logic block 200 may broadcast its current distance (saved in register 201b) one bit at a time, for example during operation 203c (the ADVANCE_DISTANCE operation). In this case, the bits are broadcasted in the order of most significant to least significant. The minimum distance N (saved in register 201c) can be computed one bit at a time, for example using an adder circuit or a Digital Signal Processors (DSP) module. This routine requires time proportional to the length of the bit (BIT_LENGTH).

Figure 5:
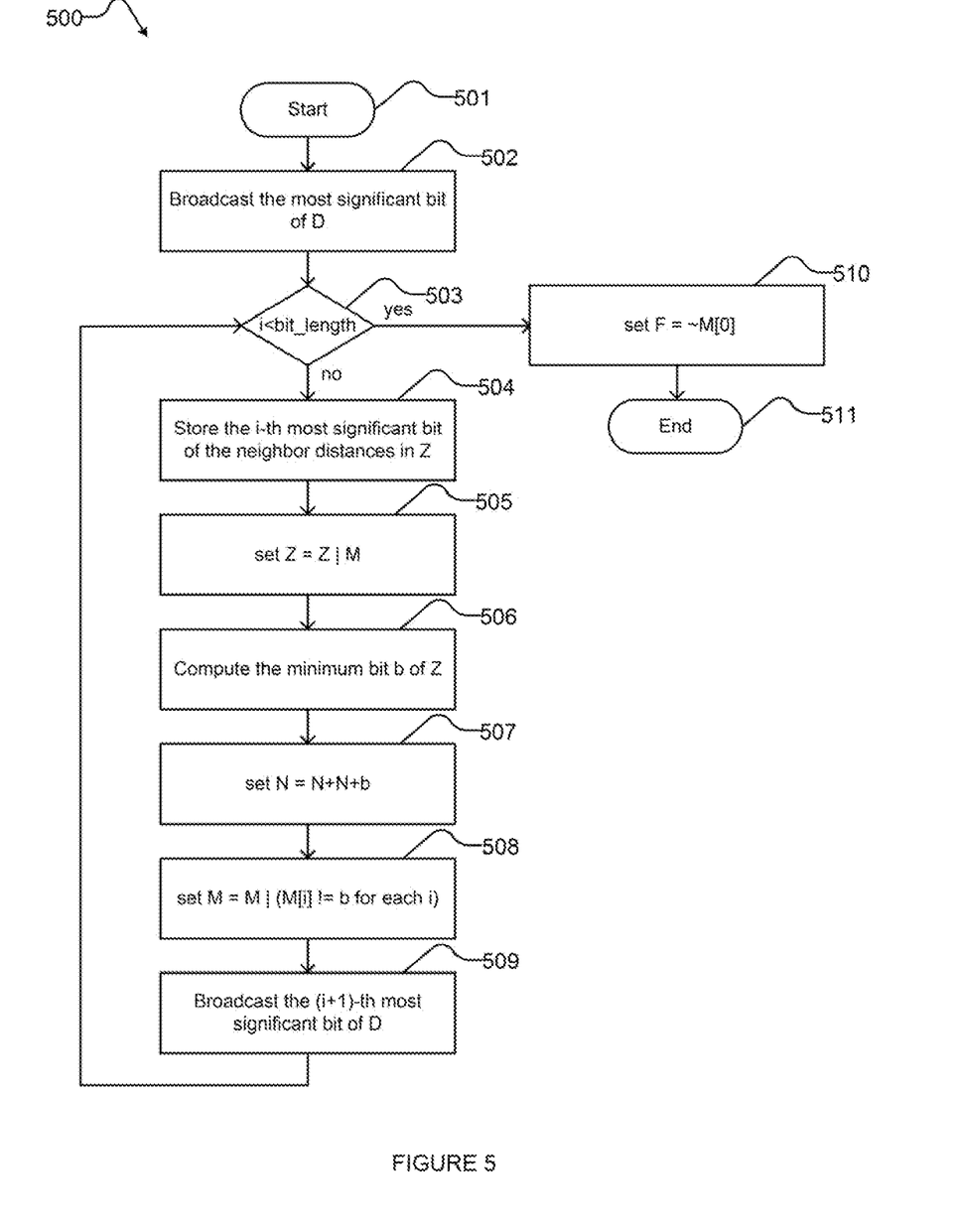
FIG. 5 is a flow chart showing an example method of implementing the ADVANCE_DISTANCE operation of the method of FIG. 4.
Figure 6:
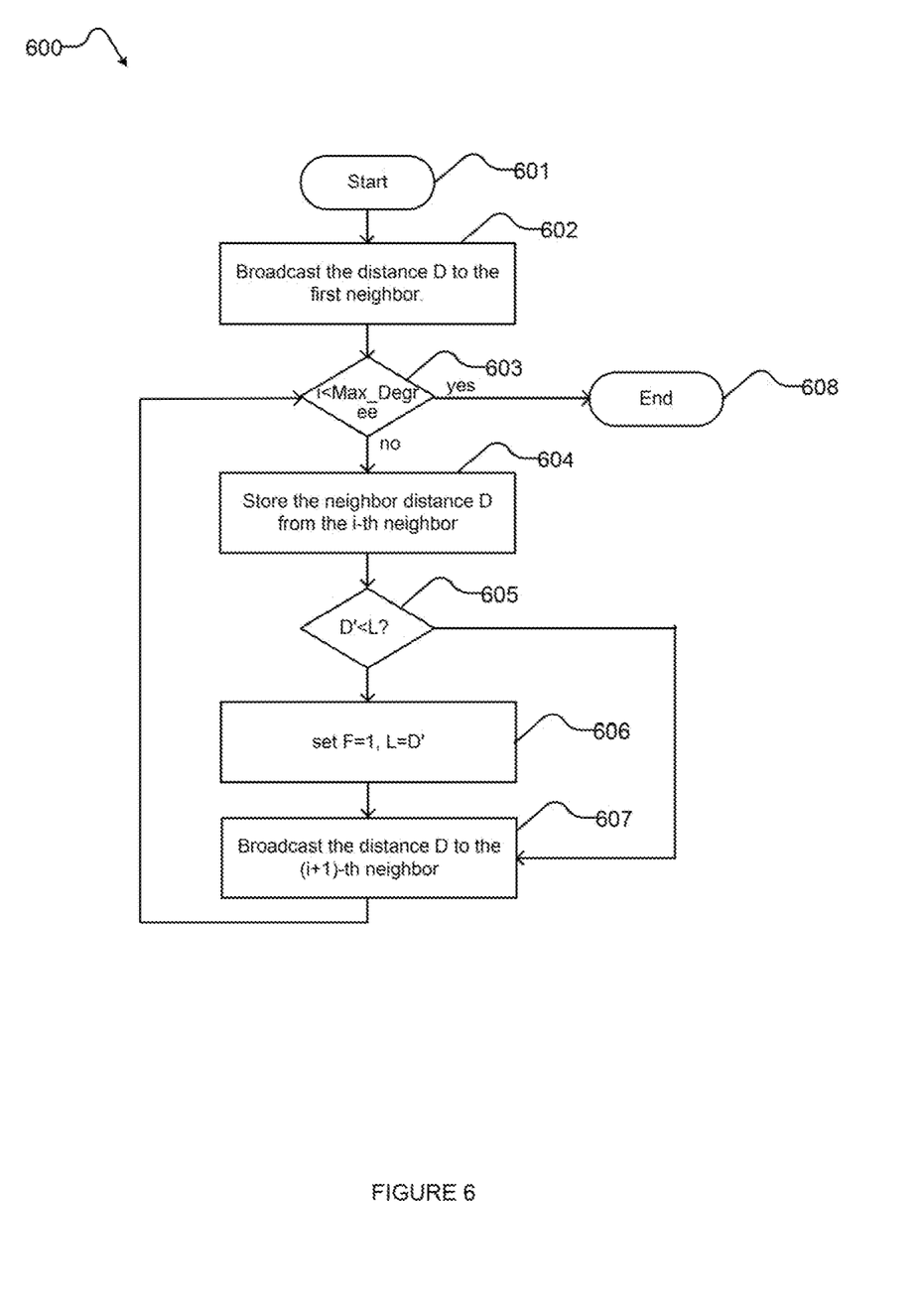
FIG. 6 is a flow chart showing an example method of implementing the ADVANCE_DISTANCE operation when each logic block is connected to k in-ports and k out-ports.

FIG. 5 is a flow chart showing an example method 500 of implementing a portion of the ADVANCE_DISTANCE operation (operation 203c of FIG. 2). Method 500 may be used at acts 405 and/or 409 of method 400 of FIG. 4. Method 500 may be implemented by a digital processor in a hybrid computing system, for example hybrid computing system 100 of FIG. 1, where the digital processor is communicatively coupled to at least one microprocessor, for example microprocessor 300 of FIG. 3. The microprocessor may have one logic block per each node of the target graph and logic blocks may be communicatively coupled according to the edges of the target graph.

Method 500 comprises acts 501 to 511; however, a person skilled in the art will understand that the number of acts is an example, and, in some implementations, certain acts may be omitted, further acts may be added, and/or the order of the acts may be changed.

Method 500 starts at 501, for example in response to a call from another routine, for example from method 400 of FIG. 4.

At 502, the digital processor causes one of logic block 200 in the microprocessor to broadcast the most significant bit of the distance register 201b (register D) to a first neighbor. The neighboring nodes of node 200 have in a fixed ordering; this ordering is coordinated between nodes such that every node will receive a distance from a single neighbor at a time. The digital processor also resets register 201c (the register N, minimum distance to neighboring nodes) and register 201d (the register L, the previous value of N) to zero, and enables the local flag 202c (flag M). N=0, M=I, L=N.

At 503, the digital processor checks whether all bits of the distance register D (register 201b) have been broadcasted. In at least one implementation, a counter i=1 . . . BIT_LENGTH may be increased at each iteration of method 500, so that at 503 the digital processor checks whether i has reached maximum value BIT_LENGTH. If all bits of D have been broadcasted control passes to 510, otherwise to 504.

At 504, the digital processor causes logic block 200 to store the $i^{th}$ most significant bit of the neighbor distances. In at least one implementation the $i^{th}$ most significant bit is stored in an array Z, with Z[0] being the $i^{th}$ most significant bit of D. The length is array Z is the number of neighbors of node 200.

At 505, the digital processor sets Z=Z|M for logic block 200, where M is the local flag 202c.

At 506, the digital processor computes the minimum entry of Z (0 or 1) for logic block 200. The minimum entry is named b. If all entries of Z are 1, then b=1. If there is at least one entry of Z that is 0, then b=0.

At 507, the digital processor updates the value of register 201c (the register N). The digital processor sets N=N+N+b for logic block 200.

At 508, the digital processor updates the value of the local flag 202c (local flag M). The digital processor sets M=M| (M[i]!=b for each i) for logic block 200.

At 509, the digital processor causes logic block 200 to broadcast the $(i+1)^{th}$ most significant bit of register 201b (the distance register D). After 509, control passes to 503, where the digital processor checks whether all bits of register 201b have been broadcasted.

At 510, the digital processor updates the value of the local flag 202b (local flag F) according to the value of M[0], where M[0] represents the current node. The digital processor sets F=~M[0] for logic block 200; i.e., if M[0]=0, then F=1, and vice versa.

At 511, method 500 terminates, until it is, for example, invoked again.

Those skilled in the art will see that the acts 502 through 509 of method 500 of FIG. 5 may be modified to work with sets of k bits at a time. In this case, this routine requires time proportional to BIT_LENGTH/k. Note that k may be equal to BIT_LENGTH.

In some implementation of the systolic array, where there is an auxiliary semi-local I/O fabric that facilitates message-passing, logic block 200 may be connected to k in-ports and k out-ports, each having a width of BIT_LENGTH. In this case, the routine requires time proportional to MAX_DEGREE/k. FIG. 6 below will be described assuming k=1.

FIG. 6 is a flow chart showing an example method 600 of implementing a portion of the ADVANCE_DISTANCE operation (operation 203c of FIG. 2) in an implementation of the microprocessor where each logic block 200 is connected to k in-ports and k out-ports. Method 600 may be used at acts 405 and/or 409 of method 400 of FIG. 4. Method 600 may be implemented by a digital processor in a hybrid computing system, for example hybrid computing system 100 of FIG. 1, where the digital processor is communicatively coupled to at least one microprocessor, for example microprocessor 300 of FIG. 3. The microprocessor may have one logic block per each node of the target graph and logic blocks may be communicatively coupled according to the edges of the target graph.

Method 600 comprises acts 601 to 608; however, a person skilled in the art will understand that the number of acts is an example and, in some implementations, certain acts may be omitted, further acts may be added, and/or the order of the acts may be changed.

Method 600 starts at 601, for example in response to a call from another routine, for example method 400 of FIG. 4.

At 602, the digital processor causes logic block 200 to broadcast the first k bits of the distance D to a first neighbor. In at least one implementation, logic block 200 broadcasts all bits of the distance D. The neighboring nodes of node 200 have in a fixed ordering; this ordering is coordinated between nodes such that every node will receive a distance from a single neighbor at a time. The digital processor also resets the register N (minimum distance to neighboring nodes) and L (the previous value of N) to zero, and enables the local flag M. N=0, M=I, L=N.

At 603, the digital processor checks if all bits have been broadcasted. In at least one implementation, a counter i=1 . . . MAX_DEGREE may be increased at each iteration of method 600, so that at 603 the digital processor checks whether i has reached maximum value MAX_DEGREE. If all bits of D have been broadcasted control passes to 608, otherwise to 604.

At 604, the digital processor causes logic block 200 to store in register 201c (register N) the neighbor distance D' from the $i^{th}$ neighbor.

At 605, the digital processor checks whether D'<L. If D'<L, control passes to 606, otherwise to 607.

At 606, the digital processor causes logic block 200 to set F=1 and L=D'.

At 607, hybrid computing system 100 causes the logic block to broadcast the distance D to the $(i+1)^{th}$ neighbor.

At 608, method 600 terminates, until it is, for example, invoked again.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the example acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the example methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Provisional Application No. 63/208,122; U.S. Pat. Nos. 7,533,068; 7,870,087; 8,032,474; International Patent Application WO2006066415; U.S. Pat. Nos. 9,170,278; 9,178,154, 10,755,190 and International Patent Application WO2017214331A1.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for embedding a source graph S into a target graph T, the source and target graph each having a respective plurality of nodes and weighted edges, the method executed by a digital processor communicatively coupled at least one microprocessor, the at least one microprocessor having one logic block per each node of the target graph, the logic blocks communicatively coupled according to the edges of the target graph, the method comprising, for each neighbor v of a node u of the source graph S, wherein v is mapped to the target graph T via a working embedding E(v) that is non-empty:

causing the microprocessor to send seeds to logic blocks with a corresponding node in the target graph contained in E(v);

causing the microprocessor to compute a respective minimum distance N to neighboring logic blocks from each seeded logic block;

causing the microprocessor to set, for each seeded logic block, a respective distance D to neighboring logic blocks as the respective minimum distance N plus a respective weight of the seeded logic block;

causing the microprocessor to increment, for each seeded logic block, a respective accumulator value by a respective weight of the seeded logic block;

causing the microprocessor to increment, for each seeded logic block, the respective accumulator value by the respective distance D;

causing the microprocessor to determine a minimum distance logic block by computing a minimum accumulated value A' over the respective accumulator values of the seeded logic blocks;

causing the microprocessor to compute distances $D_{min}$, for each logic block, to the minimum distance logic block; and causing the microprocessor to read distances $D_{min}$ from all logic blocks into local memory, wherein causing the microprocessor to compute distances $D_{min}$ includes causing the microprocessor to compute a respective minimum distance N to the minimum distance logic block from each logic block; and causing the microprocessor to set, for each logic block, a respective distance $D_{min}$ to the minimum distance logic block as the respective minimum distance N plus a respective weight of the logic block.

2. The method of claim 1, further comprising causing the microprocessor to perform at least one of: sending edge weights to the logic blocks, sending edge masks to the logic blocks, and sending tie-break values to the logic blocks, before causing the microprocessor to send seeds to logic blocks.

3. The method of claim 2, further comprising causing the microprocessor to set the respective accumulator value to zero for all logic blocks, after causing the microprocessor to perform at least one of: sending edge weights to the logic blocks, sending edge masks to the logic blocks, and sending tie-break values to the logic blocks.

4. The method of claim 1, wherein causing the microprocessor to send seeds to logic blocks with a corresponding node in the target graph contained in E(v), causing the microprocessor to compute a respective minimum distance N to neighboring logic blocks from each seeded logic block, causing the microprocessor to set, for each seeded logic block, a respective distance D to neighboring logic blocks as the respective minimum distance N plus a respective weight of the seeded logic block, causing the microprocessor to increment, for each seeded logic block, a respective accumulator value by a respective weight of the seeded logic block, causing the microprocessor to increment, for each seeded logic block, the respective accumulator value by the respective distance D, causing the microprocessor to determine a minimum distance logic block by computing a minimum accumulated value A' over the respective accumulator values of the seeded logic blocks, causing the microprocessor to compute distances $D_{min}$, for each logic block, to the minimum distance logic block, and causing the microprocessor to read distances $D_{min}$ from all logic blocks into local memory include causing a field-programmable gate arrays (FPGA) to send seeds to logic blocks with a corresponding node in the target graph contained in E(v), causing the FPGA to compute a respective minimum distance N to neighboring logic blocks from each seeded logic block, causing the FPGA to set, for each seeded logic block, a respective distance D to neighboring logic blocks as the respective minimum distance N plus a respective weight of the seeded logic block, causing the FPGA to increment, for each seeded logic block, a respective accumulator value by a respective weight of the seeded logic block, causing the FPGA to increment, for each seeded logic block, the respective accumulator value by the respective distance D, causing the FPGA to determine a minimum distance logic block by computing a minimum accumulated value A' over the respective accumulator values of the seeded logic blocks, causing the FPGA to compute distances $D_{min}$, for each logic block, to the minimum distance logic block, and causing the FPGA to read distances $D_{min}$ from all logic blocks into local memory.

5. The method of claim 1, wherein causing the microprocessor to send seeds to logic blocks with a corresponding node in the target graph contained in E(v), causing the microprocessor to compute a respective minimum distance N to neighboring logic blocks from each seeded logic block, causing the microprocessor to set, for each seeded logic block, a respective distance D to neighboring logic blocks as the respective minimum distance N plus a respective weight of the seeded logic block, causing the microprocessor to increment, for each seeded logic block, a respective accumulator value by a respective weight of the seeded logic block, causing the microprocessor to increment, for each seeded logic block, the respective accumulator value by the respective distance D, causing the microprocessor to determine a minimum distance logic block by computing a minimum accumulated value A' over the respective accumulator values of the seeded logic blocks, causing the microprocessor to compute distances $D_{min}$, for each logic block, to the minimum distance logic block, and causing the microprocessor to read distances $D_{min}$ from all logic blocks into local memory include causing an application-specific integrated circuit (ASIC) to send seeds to logic blocks with a corresponding node in the target graph contained in E(v), causing the ASIC to compute a respective minimum distance N to neighboring logic blocks from each seeded logic block, causing the ASIC to set, for each seeded logic block, a respective distance D to neighboring logic blocks as the respective minimum distance N plus a respective weight of the seeded logic block, causing the ASIC to increment, for each seeded logic block, a respective accumulator value by a respective weight of the seeded logic block, causing the ASIC to increment, for each seeded logic block, the respective accumulator value by the respective distance D, causing the ASIC to determine a minimum distance logic block by computing a minimum accumulated value A' over the respective accumulator values of the seeded logic blocks, causing the ASIC to compute distances $D_{min}$, for each logic block, to the minimum distance logic block, and causing the ASIC to read distances $D_{min}$ from all logic blocks into local memory.

6. The method of claim 1, wherein causing the microprocessor to send seeds to all logic blocks with a corresponding node in the target graph contained in E(v), and causing the microprocessor to compute a respective minimum distance N to neighboring logic blocks include causing the microprocessor to send seeds to all logic blocks with a corresponding node contained in E(v) in a hardware graph of a quantum processor; and causing the microprocessor to compute a respective minimum distance N to neighboring logic blocks, wherein neighboring logic blocks are communicatively coupled according to the edges of the hardware graph of the quantum processor.

7. The method of claim 1, further comprising the digital processor using distances $D_{min}$ to determine an embedding of the source graph to a hardware graph of a quantum processor; and programming the quantum processor to embed the source graph into the hardware graph.

8. The method of claim 1, wherein causing the microprocessor to determine a minimum distance logic block by computing a minimum accumulated value A' over the respective accumulator values includes causing the microprocessor to use unique tie-break values of each seeded logic block to determine a minimum distance logic block, should more than one logic block have minimum accumulated value A'.

9. The method of claim 1, wherein causing the microprocessor to set, for each seeded logic block, a respective distance D to neighboring logic blocks as the respective minimum distance N plus a respective weight of the seeded logic block includes, for each seeded logic block:
broadcasting a $i^{th}$ most significant bit of the distance D to a first neighbor, wherein i is the most significant bit of D;
determining whether all bits of D have been broadcasted;
in response to determining that all bits of D have been broadcasted, until all bits of D have been broadcasted, storing the $i^{th}$ most significant bit of the distance D in an array Z;
computing a minimum entry of Z;
setting a value of the minimum distance N to twice the value of the minimum distance N plus the minimum entry of Z; and
broadcasting a $(i+1)^{th}$ most significant bit of the distance D to the first neighbor.

10. A hybrid computing system for embedding a source graph S into a target graph T, the source graph S and target graph T each having a respective plurality of nodes and weighted edges, the hybrid computing system comprising at least one digital processor, the at least one digital processor communicatively coupled at least one microprocessor, wherein the at least one microprocessor has one logic block per each node of the target graph and logic blocks are communicatively coupled according to the edges of the target graph, the digital processor operable to, for each neighbor v of a node u of the source graph S, wherein v is mapped to the target graph T via a working embedding E(v) that is non-empty:
cause the microprocessor to send seeds to logic blocks with a corresponding node in the target graph contained in E(v);
cause the microprocessor to compute a respective minimum distance N to neighboring logic blocks from each seeded logic block;
cause the microprocessor to set, for each seeded logic block, a respective distance D to neighboring logic blocks as the respective minimum distance N plus a respective weight of the seeded logic block;
cause the microprocessor to increment, for each seeded logic block, a respective accumulator value by a respective weight of the seeded logic block;
cause the microprocessor to increment, for each seeded logic block, the respective accumulator value by the respective distance D;
cause the microprocessor to determine a minimum distance logic block by computing a minimum accumulated value A' over the respective accumulator values of the seeded logic blocks;
cause the microprocessor to compute a respective minimum distance N to the minimum distance logic block from each logic block;
cause the microprocessor to set, for each logic block, a respective distance $D_{min}$ to the minimum distance logic block as the respective minimum distance N plus a respective weight of the seeded logic block; and
cause the microprocessor to read distances $D_{min}$ from all logic blocks into local memory.

11. The hybrid computing system of claim 10, wherein the at least one digital processor is communicatively coupled to a quantum processor, the quantum processor having a plurality of qubits communicatively coupled according to a hardware graph, and wherein the target graph T corresponds to the hardware graph.

12. The hybrid computing system of claim 11, wherein neighboring logic blocks in the at least one microprocessor are communicatively coupled according to the edges of the hardware graph of the quantum processor.

13. The hybrid computing system of claim 12, wherein the at least one digital processor is further operable to: use distances $D_{min}$ to determine an embedding of the source graph to the hardware graph; and program the quantum processor to embed the source graph into the hardware graph.

14. The hybrid computing system of claim 10, wherein the at least one microprocessor is selected from a group consisting of: a programmable gate arrays (FPGA), and an application-specific integrated circuit (ASIC).

15. The hybrid computing system of claim 10, wherein the digital processor is further operable to cause the microprocessor to perform at least one of: sending edge weights to the logic blocks, sending edge masks to the logic blocks, and sending tie-break values to the logic blocks, before causing the microprocessor to send seeds to logic blocks.

16. The hybrid computing system of claim 15 wherein the digital processor is further operable to cause the microprocessor to set the respective accumulator value to zero for all logic blocks, after causing the microprocessor to perform at least one of: sending edge weights to the logic blocks, sending edge masks to the logic blocks, and sending tie-break values to the logic blocks.

17. The hybrid computing system of claim 10, wherein the digital processor is operable to cause the microprocessor to use unique tie-break values of each seeded logic block to determine a minimum distance logic block, should more than one logic block have minimum accumulated value A'.

18. The hybrid computing system of claim 10, wherein the digital processor is operable to, for each seeded logic block:
broadcast a $i^{th}$ most significant bit of the distance D to a first neighbor, wherein i is the most significant bit of D;
determine whether all bits of D have been broadcasted;
in response to determining that all bits of D have been broadcasted, until all bits of D have been broadcasted, store the $i^{th}$ most significant bit of the distance D in an array Z;
compute a minimum entry of Z;
set a value of the minimum distance N to twice the value of the minimum distance N plus the minimum entry of Z; and
broadcast an $(i+1)^{th}$ most significant bit of the distance D to the first neighbor.

* * * * *